May 25, 1965

J. N. KRAUSE 3,185,577

PACKAGE AND METHOD OF FORMING CONTAINER UTILIZED THEREIN

Filed June 22, 1962

INVENTOR
JAMES N. KRAUSE

BY
Pennie, Edmonds, Morton, Barrows & Taylor
ATTORNEYS

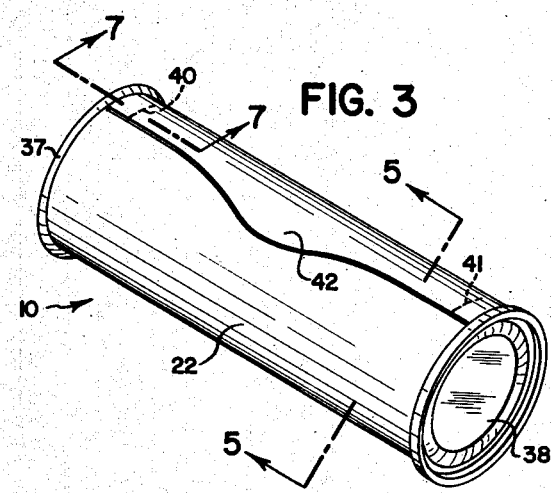
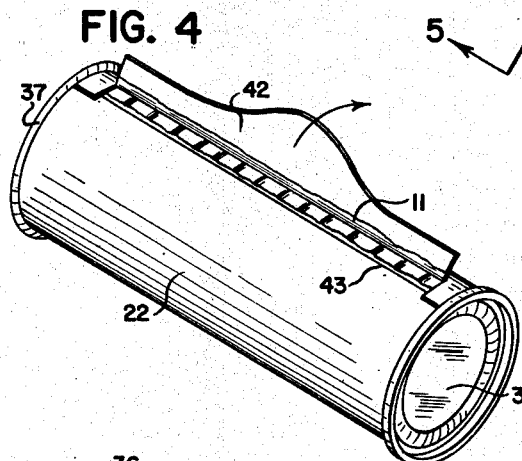
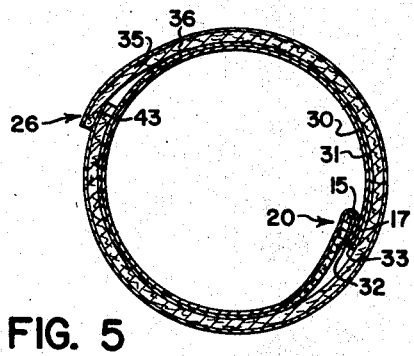
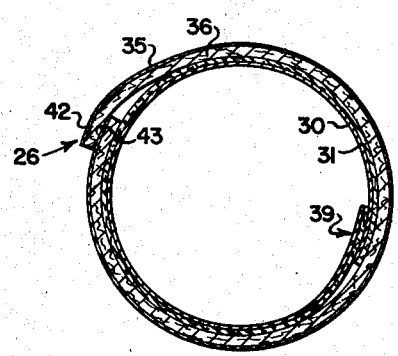
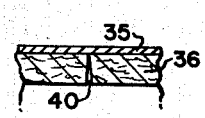

United States Patent Office 3,185,577
Patented May 25, 1965

3,185,577
PACKAGE AND METHOD OF FORMING
CONTAINER UTILIZED THEREIN
James N. Krause, Jefferson County, Ky., assignor to Anaconda Aluminum Company, a corporation of Montana
Filed June 22, 1962, Ser. No. 204,373
8 Claims. (Cl. 99—171)

This invention relates to a package for foodstuffs having a tubular substantially rigid body and a quantity of foodstuff contained therein, and to the method of making the same. More particularly, it relates to a container having a body with a liner ply adhesively sealed to a label ply possessing greater internal tear resistance than the liner ply, such that unwinding the label ply will cause the liner ply to tear open.

In the packaging of foodstuff, it is sometimes desired to provide a container which is readily openable by hand. Certain additional advantages can be achieved by constructing the container with self-opening features which are incorporated into the body of the container itself so as to obviate the necessity of opening the container through the end closure caps. It is an object of the invention to provide such a container which is substantially impervious to any leaking or wicking of the contents of the container, and nevertheless permits the container to be opened by simply unwinding the label ply of the container.

The container of the invention is comprised of a tubular substantially rigid body with end closure caps secured to each end of the body. The body is comprised of a liner ply wound to define the inner surface of the container with one marginal portion of said liner ply being overlapped and adhesively secured to the marginal portion of an adjacent convolution of said liner ply to define a liner ply seam. A label ply formed from material having greater internal tear resistance than the liner ply is wound about the liner ply and is adhesively sealed thereto to define the outer surface of the container body. One marginal portion of said label ply is overlapped and adhesively sealed to the marginal tab portion of an adjacent convolution of said label ply to define a label ply seam which is substantially out of registry with said liner ply seam so that lifting of said tab portion will effect unwinding of the label ply and the liner ply will tear open along that portion adjacent the side edge of said overlapped label ply.

It is also intended to provide a tubular container as described, having score lines cut into but not through the label ply from the inner surface thereof extending at least along the tab portion so as to facilitate unwinding of the label ply. The container is also preferably formed from a liner ply of foil and paper laminate wound with the foil disposed interiorly and defining the inner surface of the container, and the label ply is formed from a foil and paperboard laminate wound about the liner ply with the foil disposed exteriorly to define the outer surface of the container body.

By providing a separate liner ply, the container can be constructed substantially impervious to moisture penetration by the contents contained in the resultant package. This is particularly true when the liner seam is formed by one side edge being folded back against itself with its foil surface on the outside of the fold and by overlapping the folded back marginal portion with an adjacent marginal portion of an adjoining convolution of said ply and adhesively sealing the marginal portions in foil-to-foil contact. The resultant liner seam encloses both side edges of the laminate beneath the foil surface of the container body, thereby effectively preventing any wicking of moisture through the liner seam and into the body of the container.

Even if the liner ply seam is formed with a simple overlap of marginal portions of adjacent convolutions, the liner ply seam is preferably out of registry with the liner ply seam, so that if slight wicking should occur through the liner seam it would not likely penetrate the label ply seam which is intended to be the most vulnerable portion of the container to weakening. The label ply seam is non-permanently sealed and as mentioned above is preferably scored to facilitate unwinding.

One of the novel characteristics of the container consists in constructing the label ply from a material which has greater internal tear resistance than the liner ply. By constructing the container in this manner, no provisions in the nature of scoring or perforating of the liner ply need be made. Instead, as the label ply, which is adhesively sealed to the liner ply, is unwound, it will cause the liner ply to tear open along that portion immediately adjacent the label ply seam and thereby cause the entire package to be opened with a simple hand-opening operation. Of course, until the label ply seam is destroyed and the liner ply is ruptured, the container provides a structurally strong and tight sealed container suitable for many types of foodstuff and the like.

The invention also contemplates a method of forming the tubular substantially rigid body container of the invention with the end closure caps secured to each end of the body. The method comprises continuously winding a strip of liner ply such that marginal portions of adjacent convolutions overlap, and adhesively sealing the overlapped liner marginal portions to form a liner ply seam. A strip of label ply seam having greater internal tear resistance than the liner ply is continuously wound about the liner ply such that marginal portions of adjacent convolutions overlap, and the label ply is adhesively sealed to the liner ply. The overlapped marginal label portions are adhesively sealed and form a label ply seam which is substantially out of registry with the liner ply seam. The resultant tubular body members are cut to size and subsequently capped on each end with closure caps. The method of the invention also provides for winding a liner ply of foil and paper laminate and a label ply of foil and paperboard laminate. Prior to winding the liner ply of foil and paper laminate, a marginal portion along one side edge is folded back against itself with its foil surface on the outside of the fold such that upon formation of the liner seam the adjacent marginal portions of an adjoining convolution of the ply is in foil-to-foil contact therewith so as to enclose both side edges of the laminate beneath the foil surface of the container body.

A preferred embodiment of the invention is described hereinbelow with reference to the drawings wherein:

FIG. 3 is a perspective view of the container;

FIG. 4 is a perspective view of the container showing the label ply seam broken;

FIGURE 5 is a cross-sectional view of the container taken substantially along lines 5—5 of FIG. 3 showing a folded liner ply seam;

FIG. 6 is a cross-sectional view of a container according to the invention having a simple overlapping liner ply seam; and FIG. 7 is a fragmentary section of the label ply taken substantially along lines 7—7 of FIG. 3 showing the score lines in the tab portion thereof.

Figure 1:
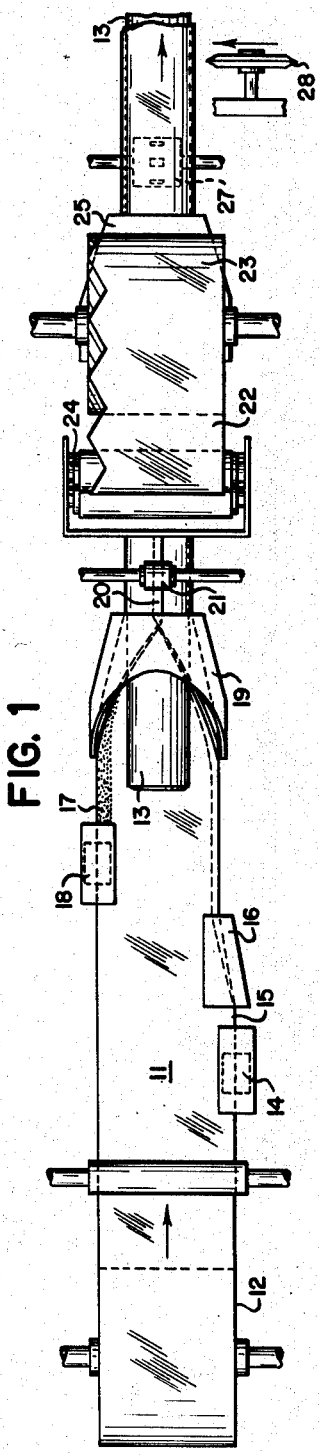
FIG. 1 is a partially schematic plan view of apparatus for forming the container body of the invention.
Figure 2:
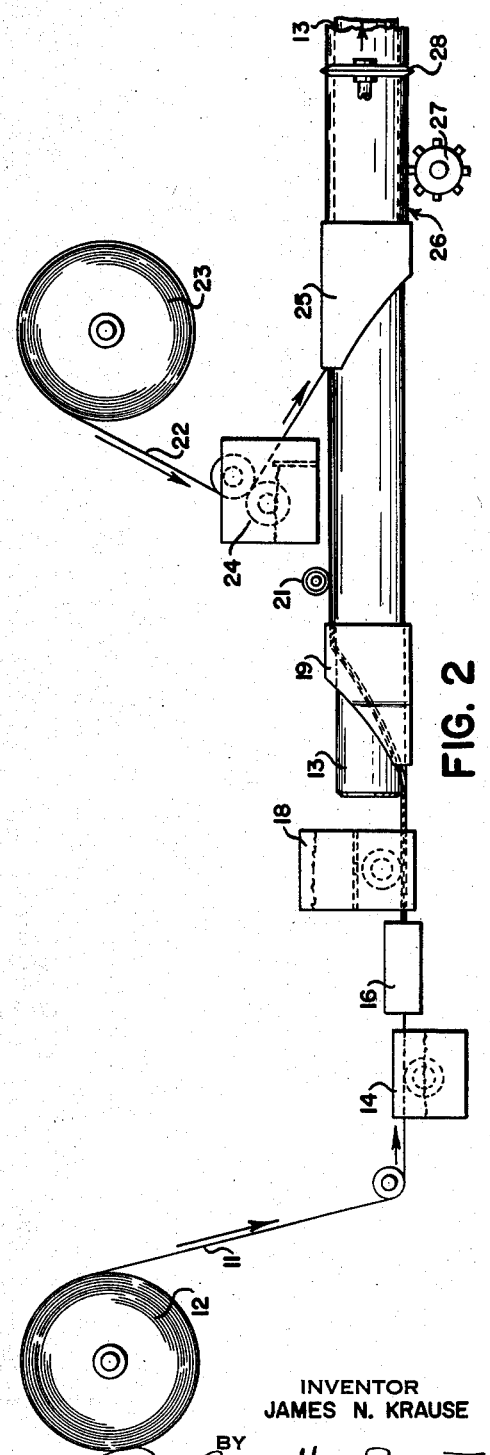
FIG. 2 is a side elevation of the apparatus of FIG. 1.

The body construction of a container 10 (FIG. 3) of the type contemplated by the present invention is best shown by describing a method of making the container with particular reference to FIGS. 1 and 2. Initially a web of liner 11 which consists of an aluminum foil and paper laminate is unwound from a roll 12 and helically wound about an adjacent stationary mandrel 13. As the liner 11 is unwound from the roll 12 it is first fed through a glue applicator 14 which coats a marginal edge portion 15 of the liner web on the paper surface thereof with an adhesive. After passing through the glue applicator 14 the liner web 11 is fed through a plow 16 which receives the adhesive coated marginal edge portion 15 of the liner web and turns it back against itself such that a paper-to-paper adhesive seal is effected on this turned back marginal portion. As marginal edge portion 15 of the liner web is being folded back against itself the opposite marginal edge portion 17 of the liner web is passing through a second applicator 18 which is applying a coating of adhesive onto the foil surface thereof. The liner web 11 is then fed axially relative to the mandrel 13 and is inserted into a wrap shoe 19 which wraps the liner web on the mandrel with the aluminum foil surface facing toward the surface of the mandrel. As the wrapped liner web emerges from the wrap shoe 19 the folded back marginal portion 15, which is folded back against itself with its folded surface on the outside of the fold such that upon overlapping of the opposite marginal portion 17 which is coated with an adhesive, the adjoining convolutions of the liner web are in foil-to-foil contact and thereby form a liner web seam 20 which encloses both side edges of the laminate beneath the foil surface which now defines the interior of the container body. Immediately upon emerging from the wrap shoe 19 the overlapping marginal portions of the adjacent convolutions of the liner web are heat and pressure sealed by a heated sealing wheel 21 which is positioned to contact the liner ply seam 20 having a foil-to-foil interface as described above and as shown in FIG. 5. Since one marginal edge portion makes foil-to-foil contact with the opposite marginal edge portion of the adjoining turn of the liner web 11, the edges of the liner web will not be exposed to the inner surface of the resultant container and hence there will be no danger of seepage by the contents of the container edgewise through the paper component of the liner ply and into the paper backing of the liner ply.

The wound liner ply is axially slid along the mandrel 13 to a point where a label ply 22, which consists of an aluminum foil and paperboard laminate having a greater internal tear resistance than liner ply 11, is wound and adhesively secured to the already wound liner ply. The label web 22 is withdrawn from a roll 23 and is passed through a glue applicator 24 where a coating of glue is applied to the paperboard ply. The thus coated label ply 22 is then passed through a second wrap shoe 25 which tightly wraps the label web about the liner web 11 such that the paperboard backing of the label ply and the paper backing of the liner ply are adhesively sealed in surface-to-surface contact. Thus the aluminum foil surface of the label ply is exposed exteriorly and defines the outer surface of the wall of the container 10 and has the marginal edge portions of the adjacent convolutions of the label ply in overlapping relationship to form a label ply seam 26 (FIG. 5). Immediately adjacent the second wrap shoe 25 there is located a heated sealing wheel 27 which has a broken peripheral surface and is aligned to contact the label ply seam 26 in discontinuous fashion so as to seal the label ply seam in such a manner that it can be readily opened by hand.

The thus-formed continuous tubular body is advanced continuously along the mandrel where it is engaged by a flying saw 28 which travels axially with the tube to cut off elongated lengths thereof. Completing the method in the ordinary way the cut tubular body members are passed to a blower to remove any dust which may have accumulated during the cutting operation and then passed to the capping means for heat sealing and crimping a closure cap on one end of the cut tubular member. The tubular members are next passed to filling means for filling the container with the desired contents and finally to a second capping means and heat sealing and crimping a closure cap on the open end of the container to form a closed package.

A detailed view of the construction of the wall of the container is shown on an enlarged scale in FIGS. 5 and 6. The container 10 may have a coating on the surface area of the interior of the container to provide corrosion protection and to insure against moisture seepage through pinholes which may be formed in the foil. The liner ply may consist of foil 30 having a thickness within the range of say 0.00035" to 0.001" and is preferably laminated to a paper 31 with a casein latex base adhesive. A typical paper used is a 20–25 lb. natural machine-glazed kraft.

As clearly shown in FIG. 5 the liner ply seam 20 is formed by folding one marginal portion 15 of the liner web back against itself, overlapping an opposite marginal portion 17 of an adjacent convolution of the liner ply in an amount equal to the width of the marginal portion 15 and adhesively sealing the overlapping portions. The result is a foil-to-foil seal along the entire length of the liner ply seam 20 which is substantially moisture impervious since edges 32 and 33 adjacent convolutions of liner are enclosed within the wall of the container beneath the liner. Hence danger of seepage into the paper backing 31 is eliminated. The label ply 22 consists of aluminum foil 35 which is ordinarily from 0.0003" to 0.0015" in thickness, glued to a paperboard 36 of a chipboard or solid kraft which ranges in thickness from say 0.0095" to 0.026". The label ply 22 is thereby constructed of material having greater interior resistance to tear than the liner ply possesses. This, as will be seen, is essential to incur the ease of opening the container in the manner of the invention.

The label ply 22 and the liner ply 11 are adhesively secured together by animal glue, casein-latex emulsion, vinyl co-polymer emulsion, sodium silicate or any other desired adhesive. The choice of the adhesive can be critical in determining the strength of the resultant container. For example, it is well recognized that sodium silicate gives a stronger and more corrosion resistant container than organic glues and one which is less likely to become pressed into eliptical shape in the filling operation thereby making capping an easier operation. Organic glues on the other hand give a softer and more resilient container which is less likely to incur any permanent indentations.

The caps 37 and 38 are roll crimped tightly around the outer periphery of the respective ends of the container 10. The cap may be heat sealed by depositing a thermoplastic material on the marginal edge portion of the cap prior to insertion into the container so that a more secure capping operation is effected.

As noted in FIG. 6 the liner ply 11 has a liner ply seam 39 which is formed by simply overlapping the marginal portions of adjacent convolutions of the liner ply. This of course does not afford the moisture impervious protection that the liner ply seam 20 shown in FIG. 5 will, but if the contents of the package are not very high in moisture content it may nevertheless provide a satisfactory seal.

Referring now to FIG. 3 and FIG. 7 it is to be noted that score lines are preferably cut into the label ply through the paperboard backing but not through the aluminum foil 35 laminated thereto. This manner of cutting score lines into but not through the label ply preserves the moisture impervious nature of the container throughout. The score lines 40 and 41 are preferably cut into marginal portion of the label ply 22 which overlaps and substantially forms a tab portion 42 where it is in overlapping relationship with the opposite marginal portion 43 of the label ply seam 26. The score lines 40 and 41 are cut into the tab portion 42 adjacent the respective caps 37 and 38 and extend peripherally about the container 10 for a length dependent upon the ease with which it is desired to open the container. As will be seen, this facilitates opening of the container.

After the container is formed as described, opening of the container is a simple operation. The tab portion 42 is simply lifted causing the tab portion to separate from the overlapped marginal portion 43 of the label ply seam 26, and the tab portion is then pulled in a direction to unwind the label ply. Lifting of the tab portion 42 and winding the label ply is somewhat facilitated by the scores 40 and 41. It is also permitted to a certain extent by the spaced adhesive sealing of the label ply seam which was effected by the sealing wheel 27 which had a discontinuous peripheral surface. Owing principally to the fact that the label ply is constructed of material having greater internal tear resistance than the linear ply 11, as shown in FIG. 4, as the tab portion 42 is lifted and the label ply is unwound, the label ply being adhesively secured to the liner ply 11 causes the liner ply to tear open along that portion immediately andjacent the side edge of the overlapped marginal portion 43 of the label ply seam. This causes the container to be totally ruptured and exposes the contents of the container which can be removed by continual unwinding of the label ply to further the rupture and destruction of the container. By this means the container, although initially strong and resistant to moisture penetration is easily opened by hand.

I claim:
1. A package of foodstuff comprising a container having a tubular substantially rigid body with closure caps secured to each end of said body and a quantity of foodstuffs contained within said container, said body comprising:
 (a) a liner ply wound to define the inner surface of the container,
 (b) a liner ply seam defined by one marginal portion of said liner ply being overlapped and adhesively secured to the marginal portion of an adjacent convolution of said liner ply,
 (c) a label ply of material having greater internal tear resistance than said liner ply, said label ply wound about said liner ply with a single convolution and adhesively sealed thereto to define the outer surface of said container body, and
 (d) a label ply seam defined by opposite marginal portions of said label ply overlapping and adhesively secured together such that a marginal tab portion is defined by said overlapipng marginal portion, and
 (e) score means in said label ply adjacent said marginal tab portion for effecting ease of unwinding said label ply by lifting said tab portion whereby said liner ply will tear open along a longitudinal portion adjacent the side edge of said overlapped ply.

2. A package of foodstuff comprising a container having a tubular substantially rigid body with end closure caps secured to each end of said body and a quantity of foodstuff contained within said container, said body comprising:
 (a) a liner ply of foil and paper laminate wound with the foil disposed interiorly and defining the inner surface of the container,
 (b) a liner ply seam defined by one marginal portion of said liner ply being overlapped and adhesively secured to the marginal portion of an adjacent convolution of said liner ply,
 (c) a label ply of foil and paperboard laminate wound about said liner ply with a single convolution and adhesively sealed thereto with the foil disposed exteriorly and defining the outer surface of said container body, said label ply having greater internal tear resistance than said liner ply, and
 (d) a longitudinal label ply seam defined by overlapped and adhesively secured to opposite marginal portions of said web such that a marginal tab portion is defined by said overlapping marginal portion, and said label ply seam is substantially out of registry with said liner ply seam and
 (e) score means in said label ply adjacent said marginal tab portion for effecting ease of unwinding said label ply by lifting said tab portion whereby said liner ply will tear open along a longitudinal portion adjacent said overlapped label ply.

3. A container comprising a tubular substantially rigid body with end closure caps secured to each end of said body and contents contained in said container, said body comprising:
 (a) a liner ply wound to define the inner surface of the container,
 (b) a liner ply seam defined by one marginal portion of said liner ply being overlapped and adhesively secured to the marginal portion of an adjacent convolution of said liner ply,
 (c) a label ply of material having greater internal tear resistance than said liner ply, said label ply wound about said liner ply with a single convolution and adhesively sealed thereto to define the outer surface of said container body, and
 (d) a longitudinal label ply seam defined by overlapped and adhesively secured to opposite marginal portions of said web such that a marginal tab portion is defined by said overlapping marginal portion, and
 (e) score means in said label ply adjacent said marginal tab portion for effecting ease of unwinding said label ply by lifting said tab portion whereby said liner ply will tear open along a longitudinal portion adjacent the side edge of said overlapped label ply.

4. A tubular container as in claim 3 wherein said score means comprise score lines cut into but not through said label ply from the inner surface thereof which extend peripherally at least along said tab portion adjacent said closure caps to facilitate unwinding of said label ply.

5. A container comprising a tubular substantially rigid body with end closure caps secured to each end of said body and contents contained in said container, said body comprising:
 (a) a liner ply of foil and paper laminate wound with the foil disposed interiorly and defining the inner surface of the container,
 (b) a liner ply seam defined by one marginal portion of said liner ply being overlapped and adhesively secured to the marginal portion of an adjacent convolution of said liner ply,
 (c) a label ply of foil and paperboard laminate wound about said liner ply with a single convolution and adhesively sealed thereto with the foil disposed exteriorly and defining the outer surface of said container body, said label ply having greater internal tear resistance than said liner ply, and
 (d) a longitudinal label ply seam defined by overlaped and adhesively secured to opposite marginal portions of said web such that a marginal tab portion is defined by said overlapping marginal portion, and said label ply seam is substantially out of registry with said liner ply seam and
 (e) score means in said label ply adjacent said marginal tab portion for effecting ease of unwinding said label ply by lifting said tab portion whereby said liner ply will tear open along a longitudinal portion adjacent said overlapped label ply.

6. A tubular container as in claim 3 wherein said liner ply has a marginal portion along one side edge folded back against itself with its foil surface on the outside of the fold, said folded back marginal portion being overlapped with and adhesively secured to the adjacent marginal portions of an adjoining convolution of said ply in foil-to-foil contact therewith, the resulting seam between adjacent convolutions of said ply enclosing both side edges of the laminate beneath the foil surface of the container body.

7. A method of forming a container having a tubular substantially rigid body on each end of which closure caps are subsequently to be secured comprising:
(a) continuously feeding a web of liner ply axially along a mandrel and winding the web such that opposite marginal portions of adjacent convolutions overlap,
(b) adhesively sealing said overlapped liner marginal portions while advancing said liner along said mandrel to form a longitudinal liner ply seam,
(c) continuously feeding a web of label ply having greater internal tear resistance than said liner ply axially with said advancing liner ply and winding said web in a single convolution such that opposite marginal portions of adjacent convolutions overlap,
(d) coating the label ply surface which is to contact said liner ply with an adhesive prior to winding to adhesively seal the label and liner plies together,
(e) adhesively sealing said overlapped label marginal portions to form a longitudinal label ply seam which is substantially out of registry with said liner ply seam, while continuously advancing the resultant tubular member along said mandrel, and
(f) cutting the resultant tubular member to size.

8. A method of forming a container having a tubular substantially rigid body on each end of which closure caps are subsequently secured comprising:
(a) continuously winding a web of liner ply such that marginal portions of adjacent convolutions overlap, said liner ply being a foil and paper laminate and prior to said winding a marginal portion along one side edge is folded back against itself with its foil surface on the outside of the fold,
(b) adhesively sealing said overlapped liner ply marginal portions to form a liner ply seam with the adjacent marginal portion of an adjoining convolution of said ply in foil-to-foil contact therewith so as to enclose both side edges of the laminate beneath the foil surface of the container body,
(c) continuously winding a web of label ply having greater internal tear resistance than said liner ply in a single convolution about said liner ply such that opposite marginal portions of said web of label ply overlap,
(d) adhesively sealing said label ply to said liner ply,
(e) adhesively sealing said overlapped marginal label portions to form a longitudinal label ply seam which is substantially out of registry with said liner ply seam, and
(f) cutting the resultant tubular member to size for capping.

References Cited by the Examiner
UNITED STATES PATENTS

| | | | |
|---|---|---|---|
| 1,973,317 | 9/34 | Hurley. | |
| 2,381,460 | 8/45 | Meyer | 93—81 XR |
| 2,623,680 | 12/52 | Wilcox. | |
| 2,695,847 | 11/54 | Fisher | 99—172 |
| 2,793,126 | 5/57 | Fienup et al. | 99—172 |
| 2,793,127 | 5/57 | Geist et al. | 99—172 |
| 2,998,339 | 8/61 | Barnes et al. | 93—94 XR |

FOREIGN PATENTS

| | | |
|---|---|---|
| 511,843 | 8/39 | Great Britain. |

A. LOUIS MONACELL, *Primary Examiner.*

ABRAHAM H. WINKELSTEIN, *Examiner.*